United States Patent [19]
Arafune

[11] Patent Number: 4,564,868
[45] Date of Patent: Jan. 14, 1986

[54] VIDEO TAPE RECORDER HAVING IMPROVED AUDIO CHARACTERISTICS

[75] Inventor: Yasunari Arafune, Kawasaki, Japan

[73] Assignee: Tokyo Shibaura Denki Kabushiki Kaisha, Kawasaki, Japan

[21] Appl. No.: 463,300

[22] Filed: Feb. 2, 1983

[30] Foreign Application Priority Data

Feb. 4, 1982 [JP] Japan .................................. 57-15516
Nov. 19, 1982 [JP] Japan ................................. 57-202947

[51] Int. Cl.$^4$ ............................................. H04N 5/782
[52] U.S. Cl. .................................. 360/19.1; 358/341; 358/343
[58] Field of Search ............... 358/310, 330, 343, 341; 360/19.1, 20, 30, 33.1

[56] References Cited

U.S. PATENT DOCUMENTS

| | | | |
|---|---|---|---|
| 4,303,950 | 12/1981 | Taniguchi et al. | 360/19.1 |
| 4,486,789 | 12/1984 | Hirota et al. | 360/19.1 X |
| 4,490,751 | 12/1984 | Kono et al. | 358/330 |
| 4,492,986 | 1/1985 | Kono et al. | 358/330 |

FOREIGN PATENT DOCUMENTS

| | | |
|---|---|---|
| 3245434 | 6/1983 | Fed. Rep. of Germany . |
| 113517 | 11/1982 | Japan . |
| 2111740 | 7/1983 | United Kingdom . |
| 2113894 | 8/1983 | United Kingdom . |

Primary Examiner—Robert L. Richardson
Attorney, Agent, or Firm—Cushman, Darby and Cushman

[57] ABSTRACT

Audio signals to be recorded on a video cassette tape are frequency modulated by a frequency modulator. A subsequent pair of frequency converters produce audio signals whose carrier frequencies are different from each other. The audio signals are recorded on A and B tracks of a video cassette tape. In the playback mode, the audio signal reproduced by the video head is frequency reconverted using the same carrier frequencies that were used to frequency convert the signals. These frequency reconverted signals are then demodulated by an FM demodulator. The audio signals from the FM demodulator thus produce identical signals to the original audio signals which were recorded.

19 Claims, 15 Drawing Figures

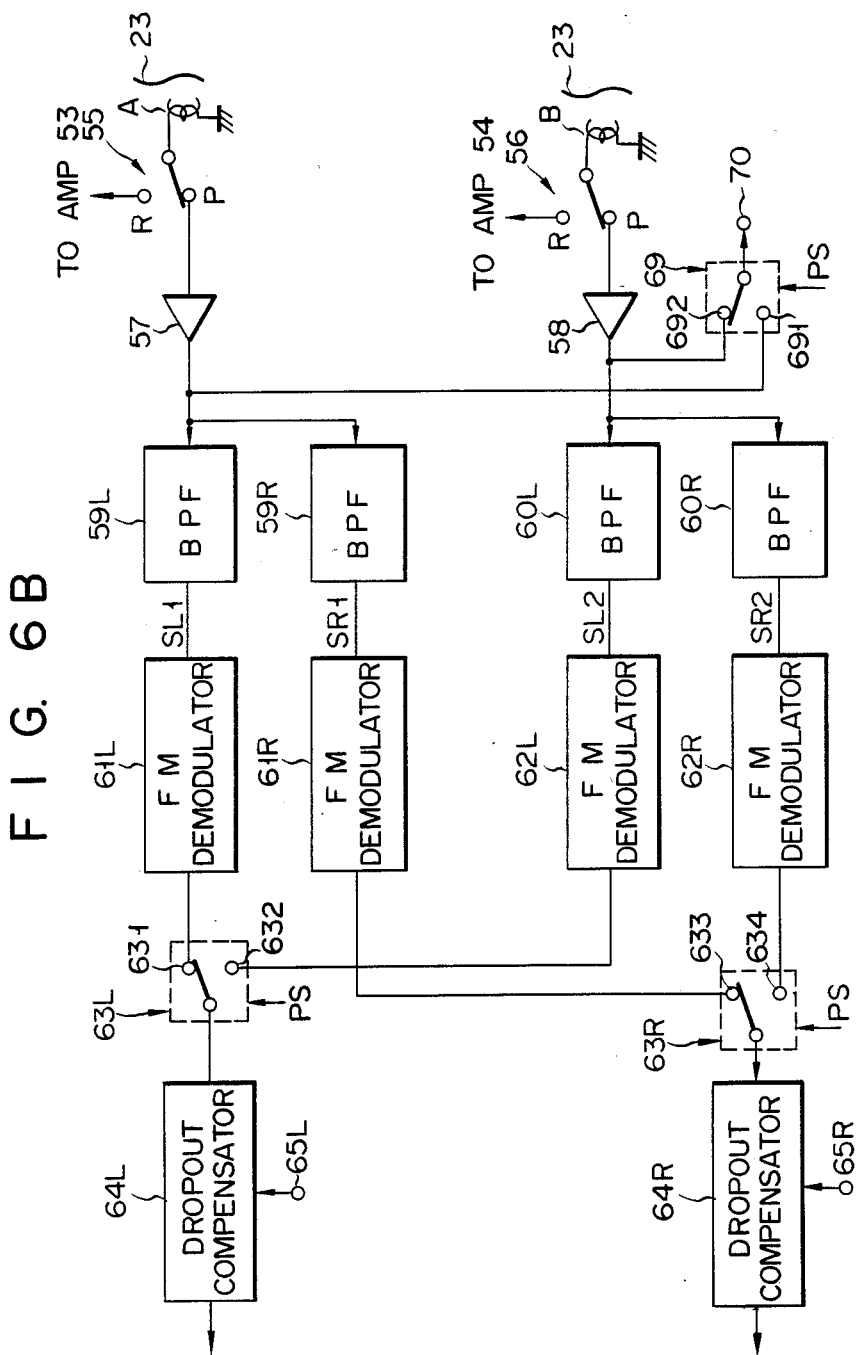
F I G. 6B

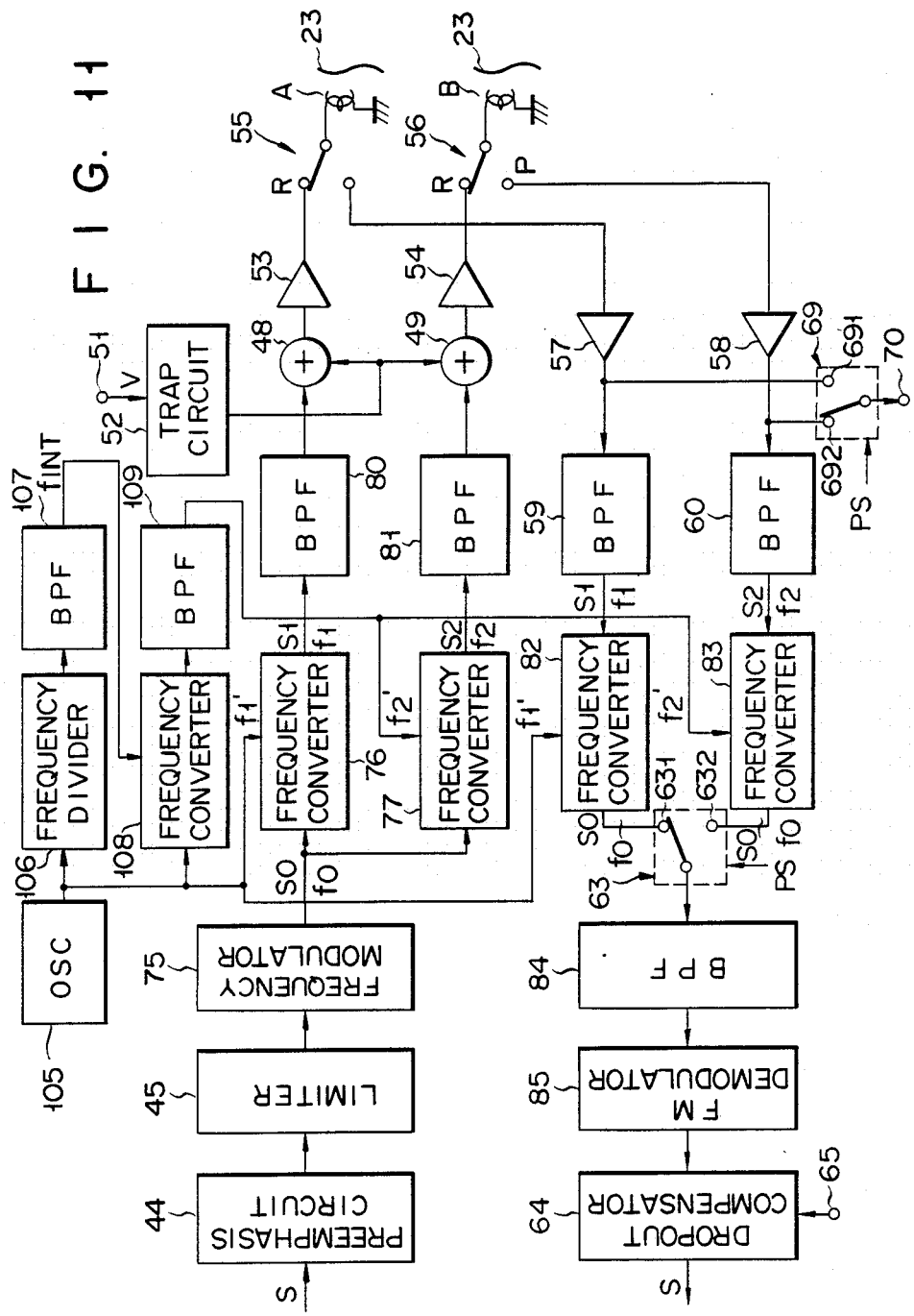

VIDEO TAPE RECORDER HAVING IMPROVED AUDIO CHARACTERISTICS

BACKGROUND OF THE INVENTION

The present invention relates to a video tape recorder and, more particularly, to a helical scan type video tape recorder in which an audio signal can be recorded on a video track of a magnetic tape.

In conventional helical scan type video tape recorders (to be referred to as VTRs hereinafter), an audio signal is recorded on an audio track along an edge portion of the magnetic tape. However, in home VTRs which perform high-density recording, the tape feeding speed tends to decrease with an increase in recording time, thereby narrowing an audio signal frequency band, degrading wow and flutter, and hence, degrading sound quality. In order to eliminate the above drawbacks, a recording system is proposed in which an audio signal is frequency-modulated and is recorded together with a video signal on a very wide video track in terms of the frequency band, using a video head.

In a helical scan type two-head home VTR, the relative speed between the video head and the magnetic tape is not changed much even if the tape feeding speed is decreased. When the audio signal recording system described above is used in such a VTR, the degradation of sound quality does not substantially occur with an increase in recording time. FIG. 1 is a block diagram of a conventional VTR with the audio recording system described above. A video signal V applied to a terminal 11 is separated by a signal separator 12 into a luminance signal Y and a carrier chrominance signal C. The luminance signal Y is supplied to a frequency modulator 14 through a preemphasis circuit 13 and is frequency-modulated therein. Meanwhile, the carrier chrominance signal C is converted by a frequency converter 15 to a low-frequency carrier chrominance signal.

An audio signal S applied to a terminal 16 is supplied to a frequency modulator 18 through a preemphasis circuit 17 and is then frequency-modulated. A modulated luminance signal Y1, a converted carrier chrominance signal C1, and a modulated audio signal S1 from the frequency modulator 14, the frequency converter 15 and the frequency modulator 18, respectively, are mixed by a mixer 19. The obtained composite signal is applied to stationary contacts R of switches 21 and 22 through a recording amplifier 20. Movable contacts of the switches 21 and 22 are respectively connected to the stationary contacts R in the recording mode. Therefore, the signals applied to the stationary contacts R are recorded on a magnetic tape 23 through video heads A and B, respectively.

In the playback mode, the movable contacts of the switches 21 and 22 are connected to stationary contacts P, respectively. The signals reproduced by the video heads A and B are amplified by playback preamplifiers 24 and 25, respectively. The amplified signals are converted to a continuous signal by a switch 26, the switching states of which are controlled by a head switching pulse PS. A high-pass filter (HPF) 27, a low-pass filter (LPF) 28, and a band-pass filter (BPF) 29 respectively extract the modulated luminance signal Y1, the converted carrier chrominance signal C1 and the modulated audio signal S1 from the output signal from the switch 26. These signals are then respectively supplied to an FM demodulator 30, a frequency converter 31 and an FM demodulator 32. The luminance signal Y from the FM demodulator 30 is supplied to a mixer 34 through a deemphasis circuit 33. The luminance signal Y is mixed with the carrier chrominance signal C which is converted by the frequency converter 31 to its original frequency band. The composite signal is then supplied as the video signal V to a terminal 35. The audio signal S demodulated by the FM demodulator 32 is supplied to a terminal 37 through a deemphasis circuit 36.

In this manner, the audio signal S is frequency-modulated and is then recorded together with the video signal V on the magnetic tape 23.

However, in the circuit arrangement described above, the carrier frequency of the modulated audio signal S1 recorded on a video track formed by the video head A (to be referred to as an A track hereinafter) is The same as that of the modulated audio signal S1 recorded on a video track formed by the video head B (to be referred to as a B track hereinafter). As a result, a crosstalk component from the adjacent track which is mixed in the modulated audio signal S1 reproduced from the A or B track is large, resulting in a repetitive "buzzing" sound and hence poor playback.

SUMMARY OF THE INVENTION

It is a first object of the present invention to provide a VTR which decreases the influence of a crosstalk component which may be mixed in the playback sound from an adjacent track.

It is a second object of the present invention to provide a VTR which eliminates the need for adjustments to maintain both the frequency deviation and demodulation level of an audio signal reproduced from one video track identical with those of an audio signal reproduced from the adjacent video track.

It is a third object of the present invention to provide a VTR which can be manufactured at low cost and which can make negligibly small, without using an adjustment means, the difference of DC level deviation between two audio signals reproduced from two adjacent video tracks and demodulated even if a frequency departure occurs in a carrier signal for frequency conversion.

In order to achieve the first object of the present invention, there is provided a means in a VTR which frequency-modulates an audio signal and records the signal with two video heads on the video track, said means being adapted to produce two audio signals whose carrier frequencies are different from each other and to supply the two audio signals to the two video heads, respectively.

In order to achieve the second object of the present invention, there is provided a means for modulating the frequency of the audio signal and a means for frequency-converting the modulated audio signal so as to produce two audio signals whose carrier frequencies are different from each other.

In order to achieve the third object of the present invention, there is provided a means for frequency-modulating the audio signal, means for frequency-converting the modulated audio signal so as to produce two audio signals whose carrier frequencies are different from each other, and a carrier signal generating means which has one oscillating means and generates two carrier signals for frequency conversion using an oscillation signal from said oscillating means.

BRIEF DESCRIPTION OF THE DRAWINGS

FIGS. 6A and 6B are block diagrams of a VTR according to a second embodiment of the present invention;

FIG. 11 is a block diagram of a VTR according to a fifth embodiment of the present invention.

DETAILED DESCRIPTION OF THE PREFERRED EMBODIMENTS

Figure 1:
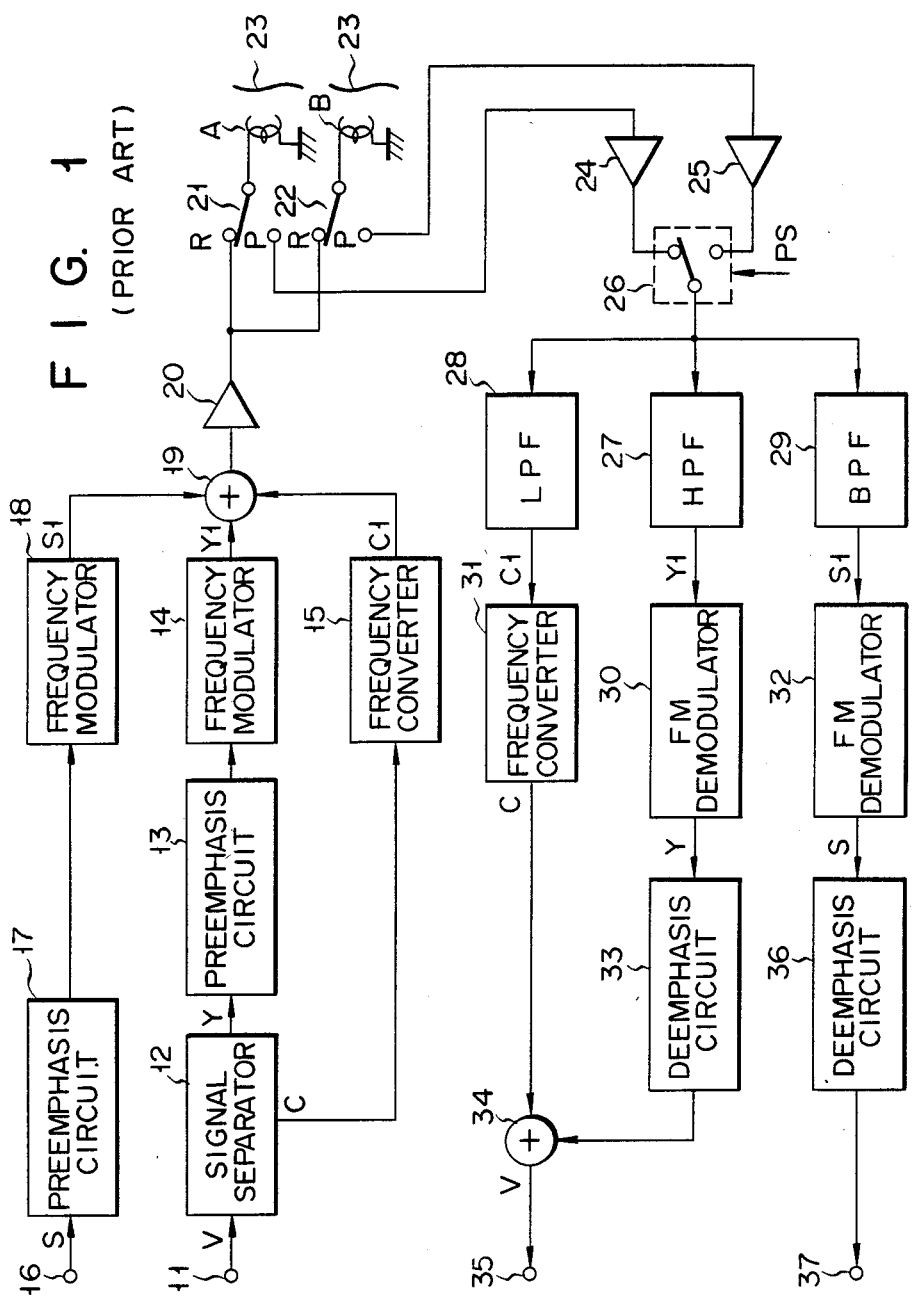
FIG. 1 is a block diagram of a conventional VTR.
Figure 2:
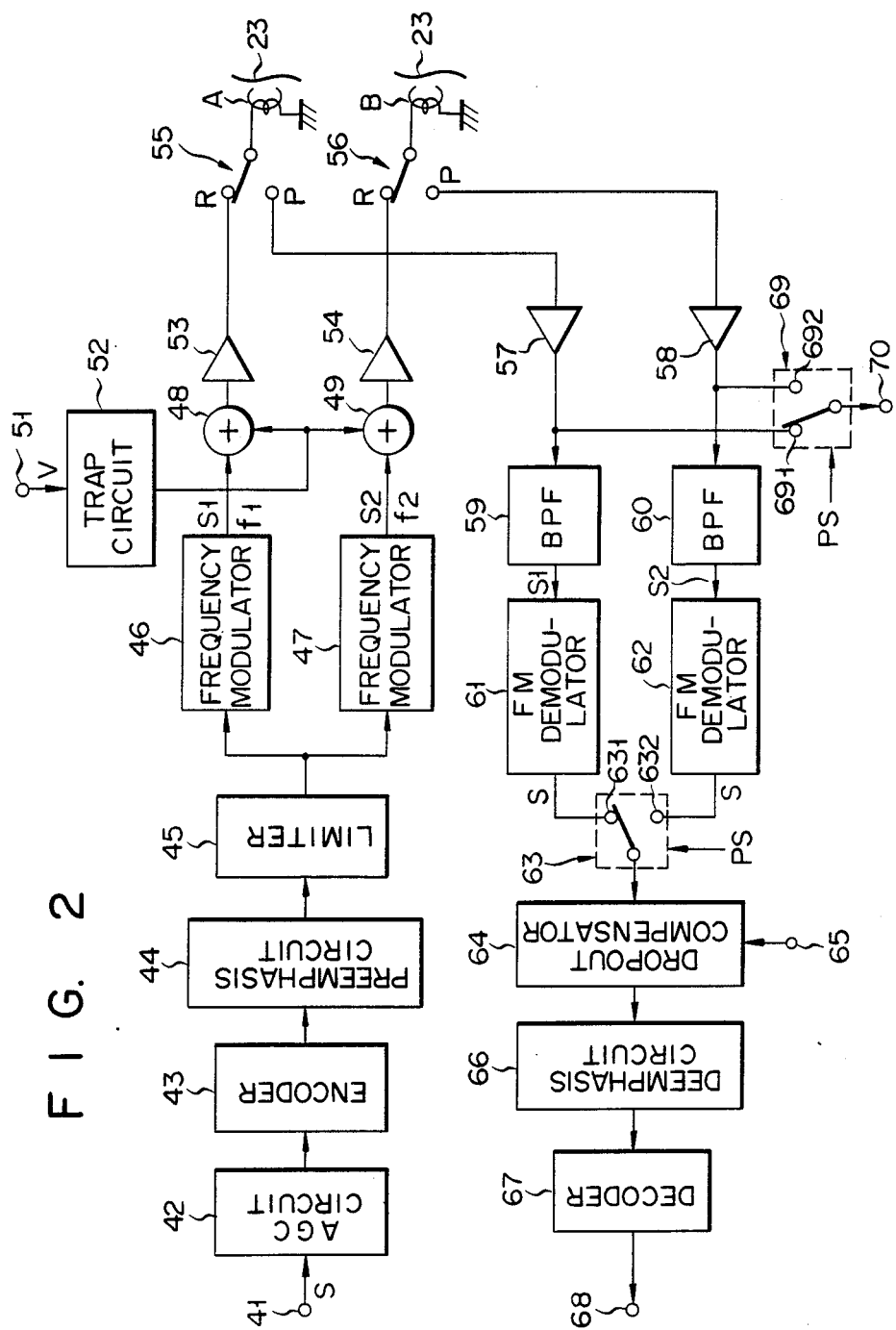
FIG. 2 is a block diagram of a VTR according to a first embodiment of the present invention.

Preferred embodiments of VTRs according to the present invention will be described in detail hereinafter with reference to the accompanying drawings. FIG. 2 shows a video tape recorder according to the first embodiment of the present invention. The video tape recorder has two frequency modulators. The frequency modulators respectively produce two audio signals which have different carrier frequencies. The audio signals having different carrier frequencies are recorded on A and B tracks, respectively.

The components of the VTR which function when the recorder is set to the recording mode and their operations will now be described. A terminal 41 receives an audio signal S for recording. The amplitude of the audio signal S is controlled by an automatic gain control circuit (to be referred to as an AGC circuit) 42. The amplitude-controlled audio signal S is compressed by an encoder 43 so as to decrease noise. The audio signal S from the encoder 43 is supplied to a preemphasis circuit 44 which emphasizes the high-frequency component of the audio signal S. The amplitude of the audio signals is then limited by a limiter 45 so as to prevent overmodulation of an output signal. It will be noted that the limiter 45 may be omitted.

Figure 3:
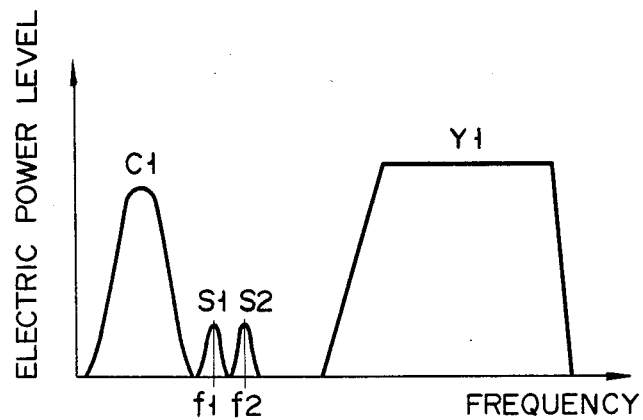
FIG. 3 is a frequency spectrum diagram showing carrier allocations of the audio signal and the video signal.

The audio signal S is supplied from the limiter 45 to frequency modulators 46 and 47 and frequency-modulated by these modulators 46 and 47. The frequency modulator 46 generates an audio signal having a carrier frequency f1, and the frequency modulator 47 generates an audio signal having a carrier frequency f2. A frequency-modulated audio signal S1 (carrier frequency f1) from the frequency modulator 46 is supplied to one input terminal of a mixer 48. A frequency-modulated audio signal S2 (carrier frequency f2) from the frequency modulator 47 is supplied to one input terminal of a mixer 49. Meanwhile, a video signal V applied to a terminal 51 is supplied to a trap circuit 52 and is then supplied to the other input terminal of each of the mixers 48 and 49. In other words, the audio signals S1 and S2 are each mixed with the video signal V by the mixers 48 and 49, respectively. Thereafter, the composite signals are recorded on the magnetic tape. The video signal V applied to the terminal 51 is a composite signal of a frequency-modulated luminance signal Y1 and a low-frequency converted carrier chrominance signal C1. The video signal V is supplied to trap circuit 52 so as to trap a superposed band component of the audio signals S1 and S2 superposed on the video signal V for recording. In this case, a band gap is formed between the frequency band of the modulated luminance signal Y1 and that of the low-frequency converted carrier chrominance signal C1, as shown in FIG. 3. A frequency band corresponding to the gap is regarded as the superposed band of the audio signals S1 and S2. Therefore, the carrier frequencies f1 and f2 are set so that the frequency bands of the audio signals S1 and S2 correspond to the frequency band in the gap. The trap circuit 52 further has a function to eliminate an unnecessary signal component mixed in the frequency band of the gap.

The audio signals S1 and S2, each mixed with the video signal V, are amplified by recording amplifiers 53 and 54, respectively, and are then supplied to stationary contacts R of switches 55 and 56, respectively. The movable contacts of the switches 55 and 56 are connected to video heads A and B, respectively. The movable contacts of the switches 55 and 56 are connected to the stationary contacts R in the recording mode. The audio signal S1 together with the video signal V is recorded obliquely with respect to the magnetic tape 23 by the video head A. Similarly, the audio signal S2 together with the video signal V is recorded obliquely with respect to the running magnetic tape 23 by the video head B. In the VTR of the type described above, the audio signal S1 having a carrier frequency f1 is recorded on the A track, whereas the audio signal S2 having a carrier frequency f2 is recorded on the B track.

The components of the video tape recorder which function when the recorder is set to the playback mode and their operations will now be described. In this mode, the movable contacts of the switches 55 and 56 are connected to the stationary contacts P, respectively. The audio signal S1 and the video signal V which are reproduced by the video head A are amplified by a preamplifier 57. Similarly, the audio signal S2 and the video signal V which are reproduced by the video head B are amplified by a preamplifier 58. The output signals from the preamplifiers 57 and 58 are respectively supplied to band-pass filters 59 and 60 which filter out signals having center frequencies f1 and f2, respectively. The band-pass filters 59 and 60 respectively extract audio signals S1 and S2 from the output signals from the preamplifiers 57 and 58. The extracted signals are then supplied to FM demodulators 61 and 62. The FM demodulators 61 and 62 demodulate the audio signals S1 and S2 respectively to produce the audio signals S before frequency modulation. The audio signals S from the FM demodulators 61 and 62 are respectively supplied to stationary contacts 631 and 632 of a switch 63.

The switch 63 is switched in response to a head switching pulse PS. When the signals are reproduced by the video head A, the movable contact of the switch 63 is connected to the stationary contact 631. However, when the signals are reproduced by the video head B, the movable contact of the switch 63 is connected to the stationary contact 632. The audio signal S from the switch 63 is supplied to a dropout compensator 64. When a dropout detection pulse is supplied to a terminal 65, the dropout compensator 64 performs dropout compensation. The audio signal S from the dropout compensator 64 is supplied to a deemphasis circuit 66, so that the high-frequency component which is emphasized in recording is attenuated, thus producing the original signal. The audio signal from the deemphasis circuit 66 is expanded by a decoder 67 and then appears at a terminal 68.

The output signals from the preamplifiers 57 and 58 are also respectively supplied to stationary contacts 691 and 692 of a switch 69. In the playback mode, the switch 69 is switched to a video head in contact with the tape, in response to the head switching pulse PS in the same manner as the switch 63. The output signal from the switch 69 is supplied to a video signal processing circuit (not shown) through a terminal 70, so that the video signal may be processed therein.

In the embodiment as described above, the audio signals S1 and S2 respectively recorded on the two tracks have different carrier frequencies. Therefore, only the audio signal S1 component can be extracted by the band-pass filter 59 from the reproduction output signal of the video head A. Similarly, only the audio signal S2 component can be extracted by the band-pass filter 60 from the reproduction output signal of the video head B. The influence of the crosstalk component from the adjacent track in the reproduction of the audio signal can thus be minimized.

Figure 4:
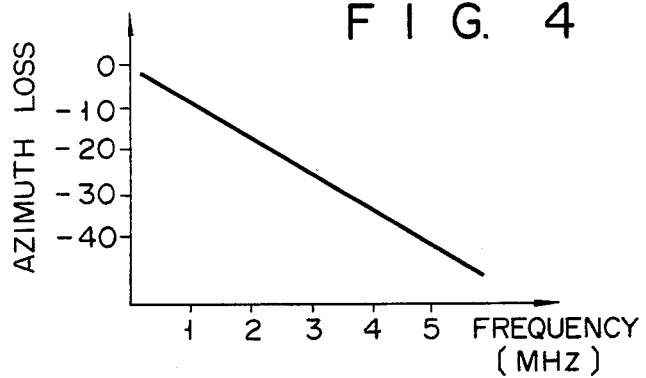
FIG. 4 illustrates the relation between azimuth loss and frequency.

In a home VTR, a recording system is used in which no guardband is provided between adjacent tracks, so as to improve a recording density. Furthermore, a recording pattern is formed such that a video track width is narrower than a video head width so as to also achieve a higher recording density. When the above recording system is adopted, the influence of the crosstalk component from the adjacent track is increased. The home VTR thus adopts an azimuth recording system. This system has two video heads of which gaps are inclined in opposite direction by the same angle (azimuth) relative to the direction perpendicular to the scanning direction, either for recording and reproducing signals. Either head has good reproduction characteristics when it reproduces the signals it has recorded and has poor reproduction characteristics when it reproduces the signals the other head has recorded. The above reproduction characteristics is called an azimuth loss effect, thereby decreasing the influence of the crosstalk component from the adjacent track. FIG. 4 is a graph showing the azimuth loss effect. As may be apparent from FIG. 4, the azimuth loss effect increases as the frequency increases. The superposed band of the audio signals S1 and S2 falls in a range of 1.3 to 1.8 MHz. The azimuth loss effect in this frequency band is not very great, as may be apparent from FIG. 4. Therefore, the crosstalk component applied from the adjacent track can be decreased owing to the azimuth loss effect, but a little for the audio signals S1 and S2. In the above embodiment, since the carrier frequencies of the audio signals S1 and S2 recorded on the respective tracks are different from each other, it is very effective to coincide the superposed band of the audio signals S1 and S2 with a band where not much of an azimuth loss effect is expected. Meanwhile, since the frequency-modulated luminance signal Y1 has a high frequency band, as shown in FIG. 3, the crosstalk component thereof can be decreased by the azimuth loss effect. Since the low-frequency converted carrier chrominance signal C1 has a low frequency band, as shown in FIG. 3, the azimuth loss effect cannot be so effective in decreasing the crosstalk component thereof in the same manner as for the audio signals S1 and S2. However, the above problem can be resolved when the chrominance signal C1 is processed in a special manner. The method of processing the signal C1 is not described here.

Figure 5:
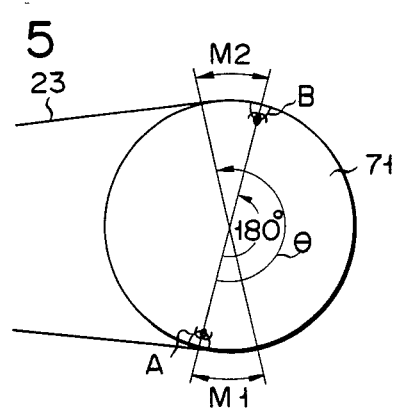
FIG. 5 is a view for explaining the effect of the VTR shown in FIG. 2.

Furthermore, in this embodiment, the movable contacts of the switches 55 and 56 are constantly connected to the stationary contacts R in the recording mode, whereas the movable contacts thereof are constantly connected to the stationary contacts P in the playback mode, thus simplifying the switching timings of the switch 63. The switching timings are described in detail with reference to FIG. 5. In this case, the magnetic tape 23 is usually looped around a stationary drum 71 by an angle $\theta$ slightly larger than 180°. The video heads A and B are spaced apart by 180° from each other. Therefore, intervals M1 and M2 exist during which the video heads A and B trace the magnetic tape 23 at the same time. Since the movable contacts of the switches 55 and 56 are constantly connected to the stationary contacts R in the recording mode, the same audio signals are recorded for the intervals M1 and M2. If the switch 63 is switched while the video heads A and B are tracing the intervals M1 and M2, the reproduced audio signals S will not be lost at whatever time the switch 63 is switched.

Figure 6A:
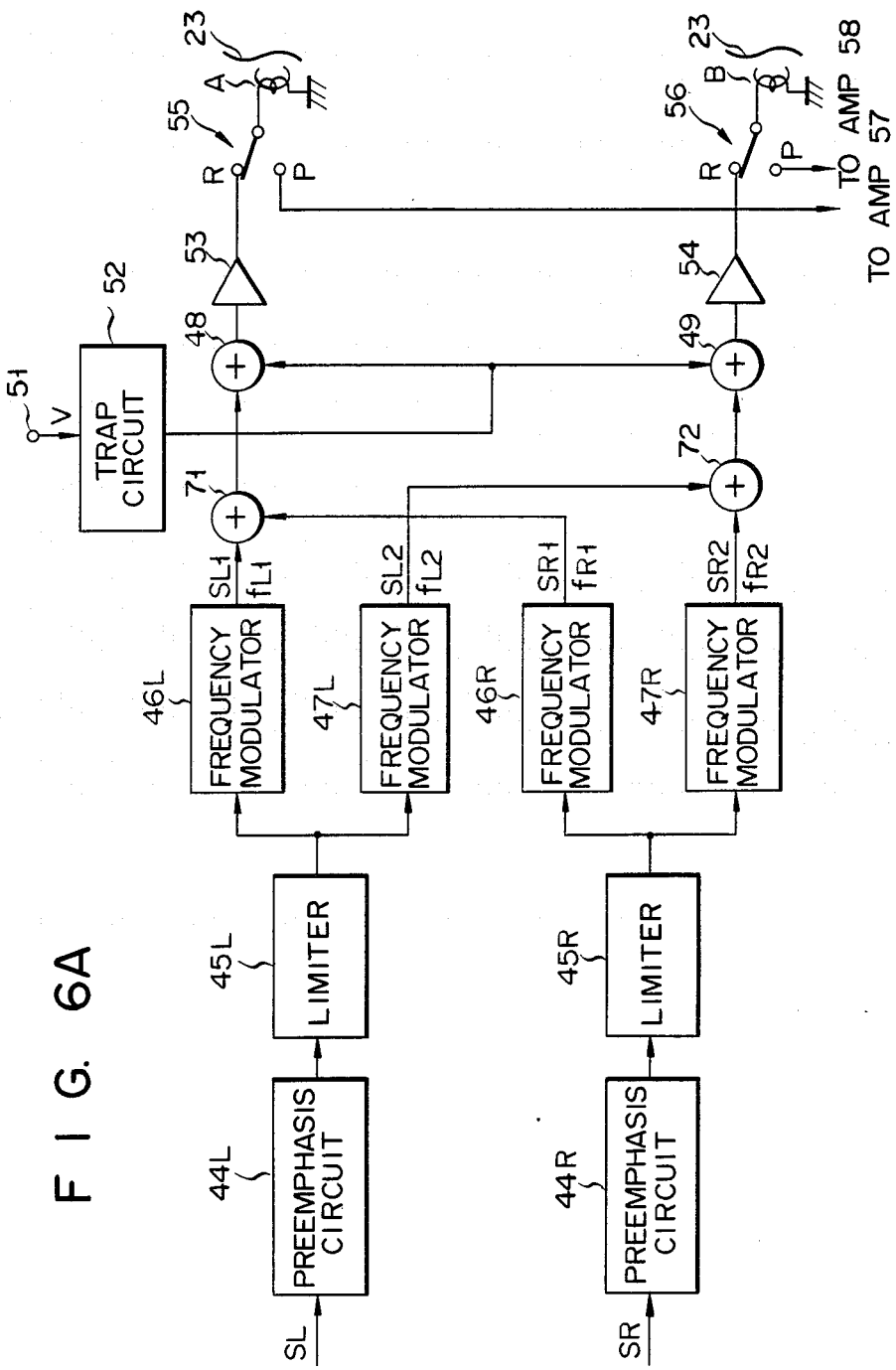

FIGS. 6A and 6B are block diagrams of a VTR according to a second embodiment of the present invention. FIG. 2 shows a case where a monaural signal is used as an audio signal, whereas FIGS. 6A and 6B show a case where a stereo signal is used as an audio signal. FIG. 6A shows component parts of the VTR which are operated in the recording mode, whereas FIG. 6B shows component parts of the VTR which are operated in the playback mode. In the latter case, the frequency modulators 46 and 47, and the FM demodulators 61 and 62 must be arranged for both right (R) and left (L) channels. The same reference numerals as used in FIG. 2 denote the same parts in FIGS. 6A and 6B. The components suffixed by L are used to process an L channel signal SL, whereas the components suffixed by R are used to process an R channel signal SR.

Figure 7:
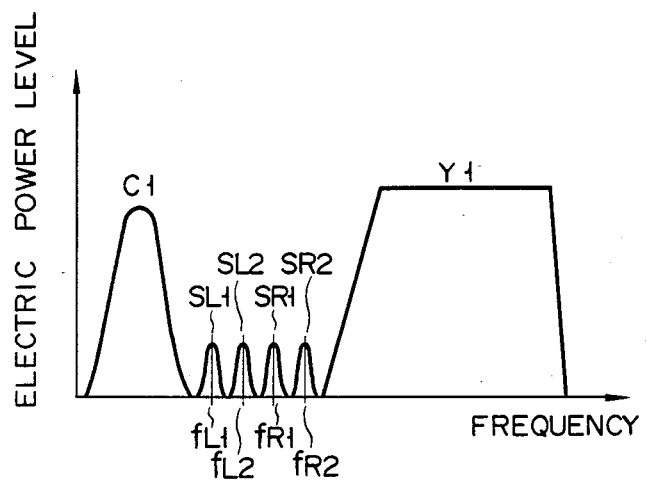
FIG. 7 is a frequency spectrum diagram showing carrier allocations of the audio signal and the video signal.

The components of the video tape recorder which function when the recorder is set to the recording mode and their operations will now be described. The L channel signal SL from a limiter 45L is frequency-modulated by frequency modulators 46L and 47L. Similarly, the R channel signal SR from a limiter 45R is frequency-modulated by frequency modulators 46R and 47R. Carrier frequencies fL1 and fL2 of L channel signals SL1 and SL2 from the frequency modulators 46L and 47L respectively are different from each other. Carrier frequencies fR1 and fR2 of R channel signals SR1 and SR2 from the frequency modulators 46R and 47R respectively are different from each other, and are also different from the carrier frequencies fL1 and fL2, as shown in FIG. 7. The frequency band of the L channel signals SL1 and SL2 and the frequency band of the R channel signals SR1 and SR2 are set to be the frequency band between the luminance signal Y1 and the carrier chrominance signal C1, respectively.

The L channel signal SL1 and the R channel signal SR1 are mixed by a mixer 71. The resultant composite signal is recorded on the magnetic tape 23 by the video head A. Similarly, the L channel signal SL2 and the R channel signal SR2 are mixed by a mixer 72. The resultant composite signal is then recorded on the magnetic tape 23 by the video head B.

The components of the video tape recorder which function when the recorder is set to the playback mode and their operations will now be described. The center frequencies of band-pass filters 59L and 59R which are connected to the video head A are set to be fL1 and fR1, respectively. Therefore, the L channel signal SL1 and the R channel signal SR1 which are included in the reproduction output signal of the video head A can be extracted by the band-pass filters 59L and 59R, respectively. The center frequencies of band-pass filters 60L and 60R which are connected to the video head B are set to be fL2 and fR2, respectively. The L channel signal SL2 and the R channel signal SR2 which are included in the reproduction output signal of the video head B are extracted by the band-pass filters 60L and 60R, respectively. The signals SL1, SR1, SL2 and SR2 are respectively demodulated by FM demodulators 61L, 61R, 62L and 62R. The L channel signals SL from the FM demodulators 61L and 62L are applied to stationary contacts 631 and 632 of a switch 63L. The R channel signals SR from the FM demodulators 61R and 62R are supplied to stationary contacts 631 and 632 of a switch 63R. The switches 63L and 63R are switched in response to head switching pulses PS. The output signals from the switches 63L and 63R are supplied to dropout compensators 64L and 64R, respectively which obtain dropout detection pulses through terminals 65L and 65R respectively.

The circuit for processing the stereo signal can be arranged by two circuits for processing the monaural signal.

Figure 8:
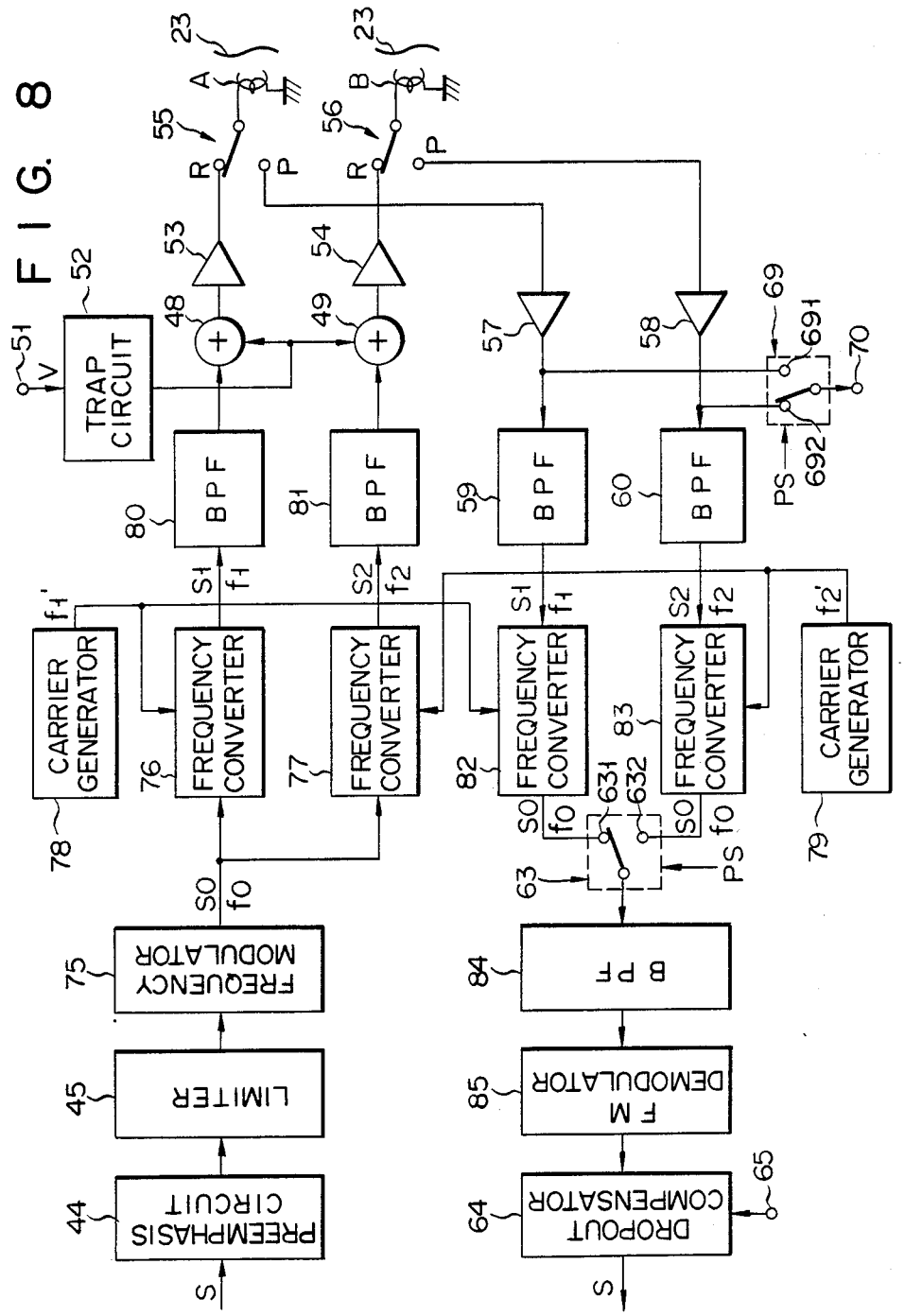
FIG. 8 is a block diagram of a VTR according to a third embodiment of the present invention.

FIG. 8 is a block diagram of a circuit of a VTR according to a third embodiment of the present invention. The same reference numerals as used in FIG. 2 denote the same parts in FIG. 8. The VTR according to this embodiment has only one frequency modulator for frequency-modulating the recording audio signal S. The frequency of the audio signal from the frequency modulator is converted to obtain two audio signals whose carrier frequencies are different from each other.

The components of the video tape recorder which function when the recorder is set to the recording mode and their operations will now be described. The recording audio signals from a limiter 45 is frequency-modulated by a frequency modulator 75. An audio signal S0 which has a carrier frequency f0 is produced from the frequency modulator 75 and is supplied to frequency converters 76 and 77. Frequencies f1' and f2' of the carrier signals for frequency conversion in the frequency converters 76 and 77 are given by equations (1) and (2) below:

$$f1' = f0 - f1 \quad (1)$$

$$f2' = f0 - f2 \quad (2)$$

The frequency converters 76 and 77 thus produce audio signals S1 and S2 which have carrier frequencies f1 and f2, respectively. It is noted that the carrier signals having the frequencies f1' and f2' are produced by carrier generators 78 and 79, respectively.

The output signals from the frequency converters 76 and 77 are respectively supplied to band-pass filters 80 and 81 of respective center frequencies f1 and f2. Only the audio signals S1 and S2 which respectively have carrier frequencies f1 and f2 are extracted by the band-pass filters 80 and 81. The band-pass filters 80 and 81 are thus arranged so as to eliminate signal components except for the audio signals S1 and S2 at the time of frequency conversion. The audio signal S1 from the band-pass filter 80 is mixed with a video signal V by a mixer 48 and is then supplied to a video head A through an amplifier 53 and a switch 55. As a result, the audio signal S1 is recorded on a magnetic tape 23. Similarly, the audio signal S2 from the band-pass filter 81 is processed in a similar manner as the audio signal S1. The audio signal S2 is then recorded on the magnetic tape 23 by a video head B.

The components of the video tape recorder which function when the recorder is set to the playback mode and their operations will now be described. The audio signal S1 extracted by the band-pass filter 59 from the output signal reproduced by the video head A is supplied to a frequency converter 82. Similarly, the audio signal S2 extracted by the band-pass filter 60 from the output signal reproduced by the video head B is supplied to a frequency converter 83. The frequency converters 82 and 83 convert the frequencies of the audio signals S1 and S2 in a manner opposite to that of the recording mode, using the carrier signals of frequencies f1' and f2', respectively. Therefore, the audio signals S0 having carrier frequency f0 are produced by the frequency converters 82 and 83, as indicated by equations (3) and (4) to be given below:

$$f1' + f1 = f0 \quad (3)$$

$$f2' + f2 = f0 \quad (4)$$

It is noted that the carrier signals having the frequencies f1' and f2' are generated by carrier generators 78 and 79, respectively.

The output signals from the frequency converters 82 and 83 are supplied to a band-pass filter 84 having a center frequency f0, through the switch 63. The band-pass filter 84 extracts only the audio signal S0, so that the signal components (other than the audio signal S0) generated during frequency conversion are eliminated. The audio signal S0 extracted by the band-pass filter 84 is demodulated by an FM demodulator 85 and is produced as the audio signal S prior to modulation.

The third embodiment can provide the same effect as the first embodiment. Furthermore, the following effects can be provided by the third embodiment. No adjustment needs to be performed in order to maintain the frequency deviations of the audio signals S1 and S2 as identical. In this embodiment, since the audio signal S is frequency-modulated by a single frequency modulator 75, the frequency deviation of the audio signals S1 and S2 may not be unbalanced between adjacent tracks. In this manner, the frequency deviation of the audio signals S1 and S2 are equal, and the demodulation level between the tracks can be readily adjusted. In particular, in the circuit of this embodiment, the audio signal S0 from the A track and the audio signal S0 from the B track are mixed by the switch 63. Thereafter, the composite signal is then demodulated, thus requiring only one FM demodulator. No adjustment needs to be performed in order to maintain the demodulation level of an audio signal reproduced from one video track identical with that of an audio signal reproduced from the adjacent video track.

According to the above embodiment, the carrier signal for frequency conversion is supplied from a single carrier generator 78 to the frequency converters 76 and 82. Similarly, the carrier signal is supplied from a single carrier generator 79 to the frequency converters 77 and 83, thus resulting in simple circuit construction.

Figure 9:
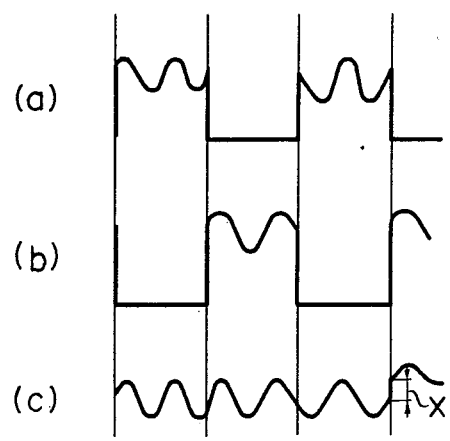
FIGS. 9A to 9C are timing charts of signals for explaining the effect of the VTR shown in FIG. 8.

A deviation x (FIG. 9C) in the DC level of the demodulated outputs between the two tracks, which is caused by the frequency departure of the carrier, can theoretically be made zero by improving the precision of the carrier generators 78 and 79. FIG. 9A shows the demodulated output from the A track, FIG. 9B shows the demodulated output from the B track, and FIG. 9C shows the output from the FM demodulator 85.

Figure 10A:
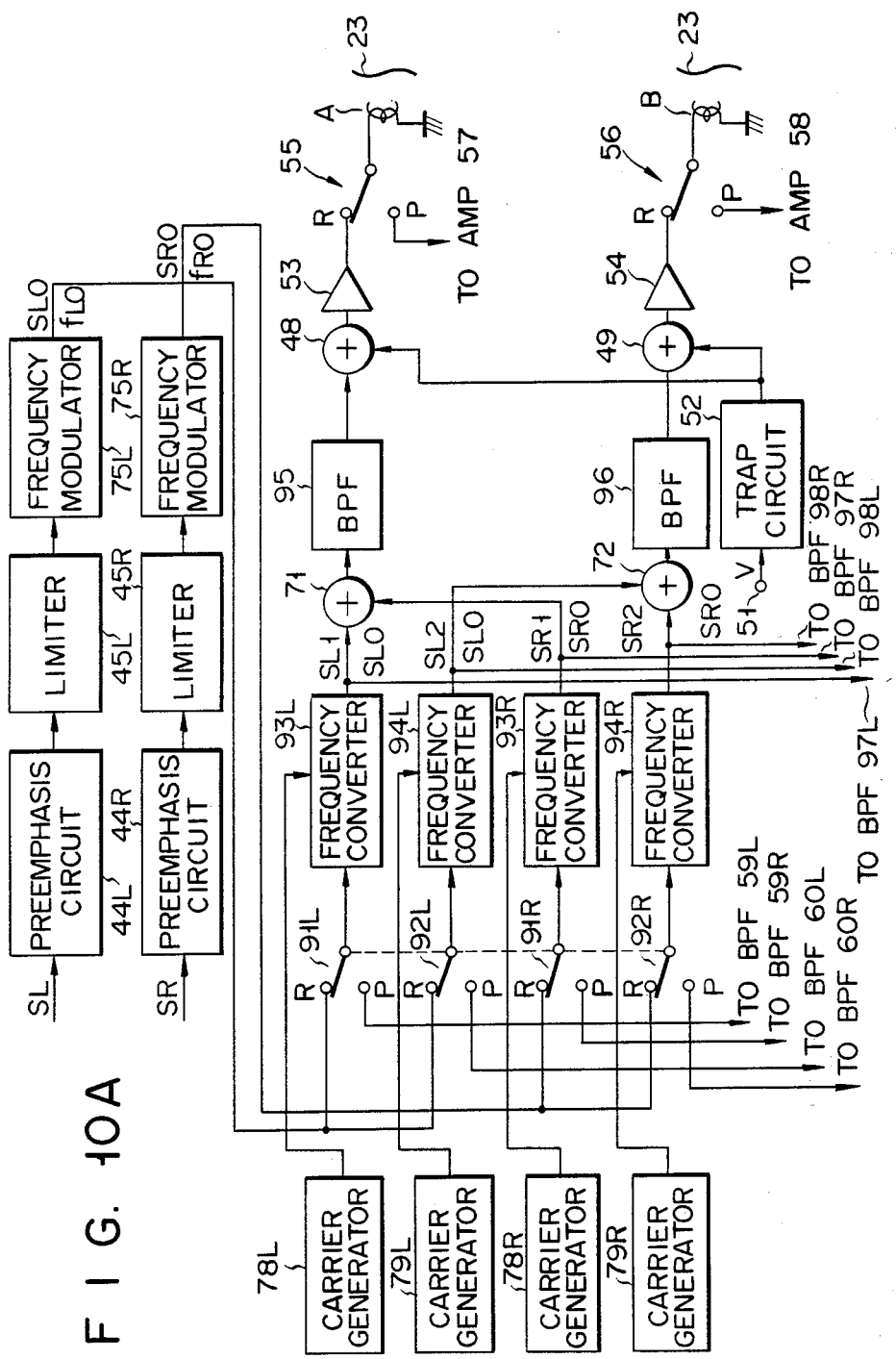
FIGS. 10A and 10B are block diagrams of a VTR according to a fourth embodiment of the present invention.
Figure 10B:
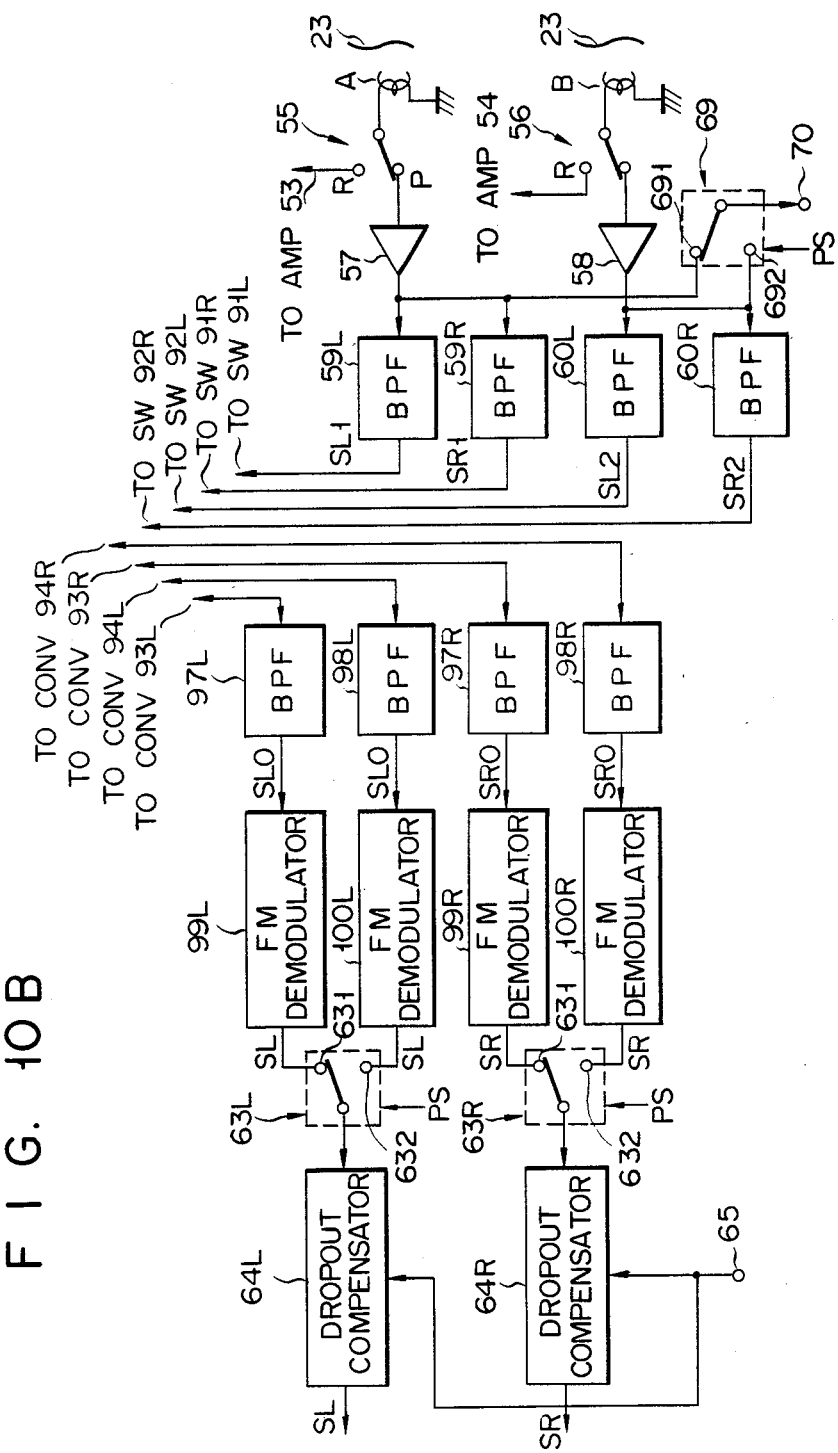

FIGS. 10A and 10B are block diagrams of a VTR according to a fourth embodiment of the present invention. The system shown in FIGS. 10A and 10B processes a stereo signal, whereas the system according to the third embodiment only processes a monaural signal. FIG. 10A shows the components which are mainly operated in the recording mode, and FIG. 10B shows the components which are mainly operated in the playback mode. In order to process the stereo signal, a two-channel system must be arranged; each channel comprises a frequency modulator, a frequency converter, an FM demodulator, and so on. The same reference numerals as used in FIG. 2 denote the same parts in FIGS. 10A and 10B, where the components which respectively process the L channel signal SL and the R channel signal SR are suffixed by symbols L and R, respectively.

The components of the video tape recorder which function when the recorder is set to the recording mode and their operations will now be described with reference to FIG. 10A. An L channel signal SL from a limiter 45L is frequency-modulated by a frequency modulator 75L. The movable contacts of switches 91L and 92L are connected to stationary contacts R in the recording mode. An L channel signal SL0 which has a carrier frequency fL0 is produced by the frequency modulator 75L and is supplied to frequency converters 93L and 94L respectively through the switches 91L and 92L. The frequency converters 93L and 94L frequency-convert the L channel signal SL0 and respectively produce L channel signals SL1 and SL2 which have carrier frequencies fL1 and fL2 respectively.

An R channel signal SR from a limiter 45R is processed in a similar manner as described above. More particularly, frequency converters 93R and 94R respectively produce R channel signals SR1 and SR2 which have carrier frequencies fR1 and fR2 respectively. In this case, the movable contacts of switches 91R and 92R are connected to the corresponding stationary contacts R, so that the switches 91R and 92R supply R channel signals SR0 having a carrier frequency fR0 from a frequency modulator 75R to the frequency converters 93R and 94R.

The L channel signal SL1 and the R channel signal SR1 are mixed by a mixer 71, and a resultant signal is supplied to a band-pass filter 95. The band-pass filter 95 extracts only the signal (SL1 and SR1) components from the output signal from the mixer 71 and does not filter any other signal component. Similarly, the L channel signal SL2 and the R channel signal SR2 are mixed by a mixer 72. A band-pass filter 96 extracts only the signal (SL2 and SR2) components from the output signal from the mixer 72.

The output signal from the band-pass filter 95 is mixed with a video signal V by a mixer 48 and is supplied to a video head A through an amplifier 53 and a switch 55. The video head A then records the signal on a magnetic tape 23. The output signal from the band-pass filter 96 is recorded on the magnetic tape 23 by a video head B in a similar manner as for the video head A.

The components of the video tape recorder which function when the recorder is set to the playback mode and their operations will now be described with reference to FIGS. 10A and 10B. The L channel signal SL1 extracted by a band-pass filter 59L from the signal reproduced by the video head A is applied to a stationary contact P of the switch 91L. The R channel signal SR1 extracted by a band-pass filter 59R from the signal reproduced by the video head A is applied to a stationary contact P of the switch 91R. The L channel signal SL2 extracted by a band-pass filter 60L from the signal reproduced by the video head B is applied to a stationary contact P of the switch 92L. Similarly, the R channel signal SR2 extracted by a band-pass filter 60R from the signal reproduced by the video head B is applied to a stationary contact P of the switch 92R.

The movable contacts of the switches 91L, 92L, 91R and 92R are connected to the stationary contacts P in the playback mode. Therefore, the L channel signals SL1 and SL2 and the R channel signals SR1 and SR2 are respectively converted to the original signal SL0 and the original signal SR0 through the frequency converters 93L and 94L and the frequency converters 93R and 94R respectively.

The output signals from the frequency converters 93L and 94L are supplied to band-pass filters 97L and 98L, respectively. The band-pass filters 97L and 98L extract only the L channel signal (SL0) components, respectively. Similarly, the output signals from the frequency converters 93R and 94R are supplied to band-pass filters 97R and 98R, respectively. The band-pass filters 97R and 98R extract only the R channel signal (SR0) components, respectively.

The L channel signals SL0 from the band-pass filters 97L and 98L are demodulated by FM demodulators 99L and 100L, respectively, and are supplied to a dropout compensator 64L through a switch 63L. The R channel signals SR0 from the band-pass filters 97R and 98R are demodulated by FM demodulators 99R and 100R, respectively, and are supplied to a dropout compensator 64R through a switch 63R.

The VTR of the fourth embodiment can provide the same effect as that of the third embodiment when only one of the L or R channels is considered. However, in this case, since two FM demodulators 99L and 100L are arranged in the L channel, for example, the demodulation levels between the tracks must be adjusted. However, since the L channel signal SL is frequency-modulated by a single frequency modulator 75 as described above, the adjustment can be readily performed. In this case, the output signals from the frequency converters 93L and 94L may be mixed by the switch 63L in the same manner as in the third embodiment, so that the above-mentioned adjustment need not be performed, and so that only one FM demodulator and one band-pass filter are required, thus resulting in convenience. In the fourth embodiment, the frequency converters 93L and 94L are used in both the recording and playback modes, thus resulting in simple construction.

A case has been described in which only the L channel is exemplified. Now, consider the effect of the VTR when two channels are considered. In this embodiment, frequency modulators which have the same electrical characteristics and the same carrier frequency can be used as the L and R channel frequency modulators 75L and 75R. This is because the audio signals SL1, SL2, SR1 and SR2 which have different carrier frequencies can be produced by properly determining the carrier frequencies for frequency conversion in the frequency converters 93L, 94L, 93R and 94R, respectively, thereby easily making the frequency deviations of the right and left channels identical. Similarly, FM demodulators which have the same electrical characteristics and the same carrier frequencies can be used as the FM demodulators 99L, 100L, 99R and 100R, so that identity of the modulation levels of the right and left channels can be easily performed.

Furthermore, a deviation in the DC levels of the demodulated outputs between the right and left channels, which is caused by the frequency departure of the carrier for frequency conversion, as well as a deviation in the DC levels of the demodulated outputs between the two tracks, can theoretically be decreased to zero.

FIG. 11 is a block diagram of a VTR according to a fifth embodiment of the present invention. The same reference numerals as in FIG. 8 denote the same parts in FIG. 11. The system shown in FIG. 11 has an oscillator, and produces the necessary carrier signals for frequency conversion using oscillation signals from the oscillator.

Referring to FIG. 11, audio signals S0 having a carrier frequency f0 from a frequency modulator 75 are respectively frequency-converted by frequency converters 76 and 77 to audio signals S1 and S2 which respectively have carrier frequencies f1 and f2. These audio signals S1 and S2 are respectively recorded on the A and B tracks. In the playback mode, the audio signals S1 and S2 having the carrier frequencies f1 and f2 which are reproduced from the A and B tracks are respectively modulated by frequency converters 82 and 83 to the audio signals S0 having a carrier frequency f0. The carrier signals for frequency conversion which are supplied to the frequency converters 76, 77, 82 and 83 are produced by a circuit which comprises an oscillator 105, a frequency divider 106, a band-pass filter 107, a frequency converter 108 and a band-pass filter 109.

The oscillator 105 oscillates an oscillation signal which has the same frequency as one of the carrier signals supplied to the frequency converters 76 and 82 or to the frequency converters 77 and 83. For example, the frequency of the oscillation signal may be the same as a frequency f1' of the carrier signals supplied to the frequency converters 76 and 82. The frequency f1' is preset to be an N multiple (where N is a natural number) of a frequency fINT, which latter corresponds to a difference between the frequency f1' and a frequency f2'. The frequency converters 76 and 77 respectively convert the signals of the frequency f0 to signals of the frequencies f1 and f2. Therefore, the frequency f1' of the carrier signal supplied to the frequency converter 76 is equal to either the difference between or sum of the frequencies f0 and f1. Similarly, the frequency f2' of the carrier signal supplied to the frequency converter 77 is equal to either the difference between or sum of the frequencies f0 and f2. The above results are summarized as follows:

$$f2' - f1' = f2 - f1 = fINT \tag{5}$$

$$f1' = N|fINT| \tag{6}$$

$$f1 = |f0 - f1'| \tag{7}$$

$$f2 = |f0 - f2'| \tag{8}$$

The oscillation signals from the oscillator 105 are supplied as carrier signals to the frequency converters 76 and 82. The oscillation signal is 1/N frequency-divided by the frequency divider 106 and an output therefrom is supplied to the band-pass filter 107. The band-pass filter 107 extracts the signal which has a frequency fINT. The frequency converter 108 uses the oscillation signal from the oscillator 105 and the signal having the frequency fINT to produce a signal having the frequency f2'. The output signal from the frequency converter 108 is supplied to the band-pass filter 109 which then extracts the signal component which has the frequency f2'. This signal component is supplied as the carrier signal for frequency conversion to the frequency converters 77 and 83.

Assume that a maximum frequency deviation of the frequency-modulated audio signal is defined as 75 kHz. Then, the frequency fINT corresponding to a difference between two carrier signals is preferably 150 kHz. The frequencies f1 and f2 fall within a range of 1.3 to 1.8 MHz between the frequency band of the luminance signal Y1 and the carrier chrominance signal C1. If the frequency f1 is 1.3 MHz, the frequency f2 is 1.45 MHz. Furthermore, if N is 32, the frequencies f1' and f2' are 4.8 MHz and 4.95 MHz, respectively. As a result, the frequency f0 (=f1'−f1=f2'−f2) is 3.5 MHz.

In the system having the configuration described above, even if a frequency departure of the carrier signal for frequency conversion occurs, and the carrier frequency in the playback mode differs from that in the recording mode, a deviation in the DC levels of the demodulated outputs between the two tracks is very small. The frequency departure in this case is caused by the oscillator 105. If the frequency departure of the oscillator 105 between the recording mode and the playback mode is designated by $\Delta f1'$, the frequencies of the carrier signals respectively supplied to the frequency converters 82 and 83 are given as f1" and f2" below:

$$f1'' = f1' + \Delta f1' \tag{9}$$

$$f2'' = (f1' + \Delta f1') + (f1' + \Delta f1')/N \\ = f2' + \Delta f1' + \Delta f'/N \tag{10}$$

The center frequencies of the audio signals S0 produced from the frequency converters 82 and 83 respectively are given as follows:

$$f1'' - f1 = f1' - f1 + \Delta f1' = f0 + \Delta f1' \tag{11}$$

$$f2'' - f2 = f2' - f2 + \Delta f1' + \Delta f1'/N \\ = f0 + \Delta f1' + \Delta f1'/N \tag{12}$$

The signals having the above-mentioned frequencies are switched by a switch 63 in units of tracks and are modulated by an FM demodulator 85. In this case, the DC level of the demodulated outputs from the FM demodulator 85 includes a shift in the DC level of the demodulated output of the audio signal (having the carrier frequency f0) corresponding to the frequency departure Δf1', and a shift corresponding to Δf1'/N. The level shift corresponding to the frequency departure Δf1' appears in both the A and B tracks to the same degree and in the same direction. As a result, this level shift does not influence the demodulated output at all. However, the level shift corresponding to Δf1'/N appears only in the B track, thereby causing low-frequency noise (i.e., hum noise) in the playback sounds. In order to reduce the low-frequency noise to a negligible amount, the low-frequency noise level with respect to the signal level must be less than −50 dB. The frequency change Δf1'/N must then be less than 80 Hz in order to achieve the low-frequency noise level. Assume that the natural number N is given to be 32. In order to keep Δf1'/N at less than 80 Hz, the frequency departure Δf1' must be less than 2560 Hz (=80×32). Since a frequency departure Δf1' of 2560 Hz is considerably large, it is easy to arrange an oscillator 105 which satisfies the above specifications. According to the circuit shown in FIG. 11, the demodulated output can be easily processed so as not to be influenced by the frequency departure Δf1' of the carrier signal from the oscillator 105.

The fifth embodiment described above provides the following effects. The two carrier signals for frequency conversion can be obtained using the oscillation signal from the single oscillator 105. The frequency departure of the oscillation signal appears uniformly in the demodulated outputs from both A and B tracks, so that a deviation in DC levels of the demodulated outputs between the A and B tracks is very small. In particular, in this embodiment, the oscillation signal is used as one carrier signal whereas a signal which is obtained by frequency-converting the oscillation signal with the signal which has the frequency fINT is used as the other carrier signal. In the circuit which has the arrangement described above, the frequency departure Δf1' does not directly appear as a deviation in the DC level. A DC component corresponding to Δf1'/N appears as the deviation. Therefore, when the frequency division ratio 1/N is suitably preset, the influence of the frequency departure can be minimized, thereby enabling use of an oscillator 105 having a considerably large frequency departure Δf1'.

Conversely, when the carrier signals are obtained from separate oscillators, respectively, the following problems are presented. A difference between the frequency departure Δf1' of the signal from the first oscillator and the frequency departure Δf2' of the signal from the second oscillator corresponds to a deviation of the DC level of either demodulated audio signal. In order to keep a difference (Δf1'−Δf2') at less than 80 Hz, an oscillator circuit is required in which an expensive quartz oscillator is used. A fine adjustment is also required to achieve the frequency precision of 80 Hz, even when the quartz oscillator is used.

However, according to the fifth embodiment of the present invention, as may be apparent from the above description, an expensive quartz oscillator need not be used. Even if a quartz oscillator is used, only one such oscillator is required. As also may be apparent from the above description, since only one oscillator is used, no fine adjustment need be performed in order to achieve the frequency precision of 80 Hz.

Furthermore, in the above embodiment, since the oscillation frequency is preset to be an N multiple (where N is a natural number) of the frequency fINT corresponding to a difference between the carrier frequencies, a simple frequency divider 106 can be used.

Furthermore, in the above embodiment, the oscillation signal has the same frequency as one of the carrier frequencies, so that a carrier generator is substantially arranged for generating the other carrier signal.

Figure 12A:
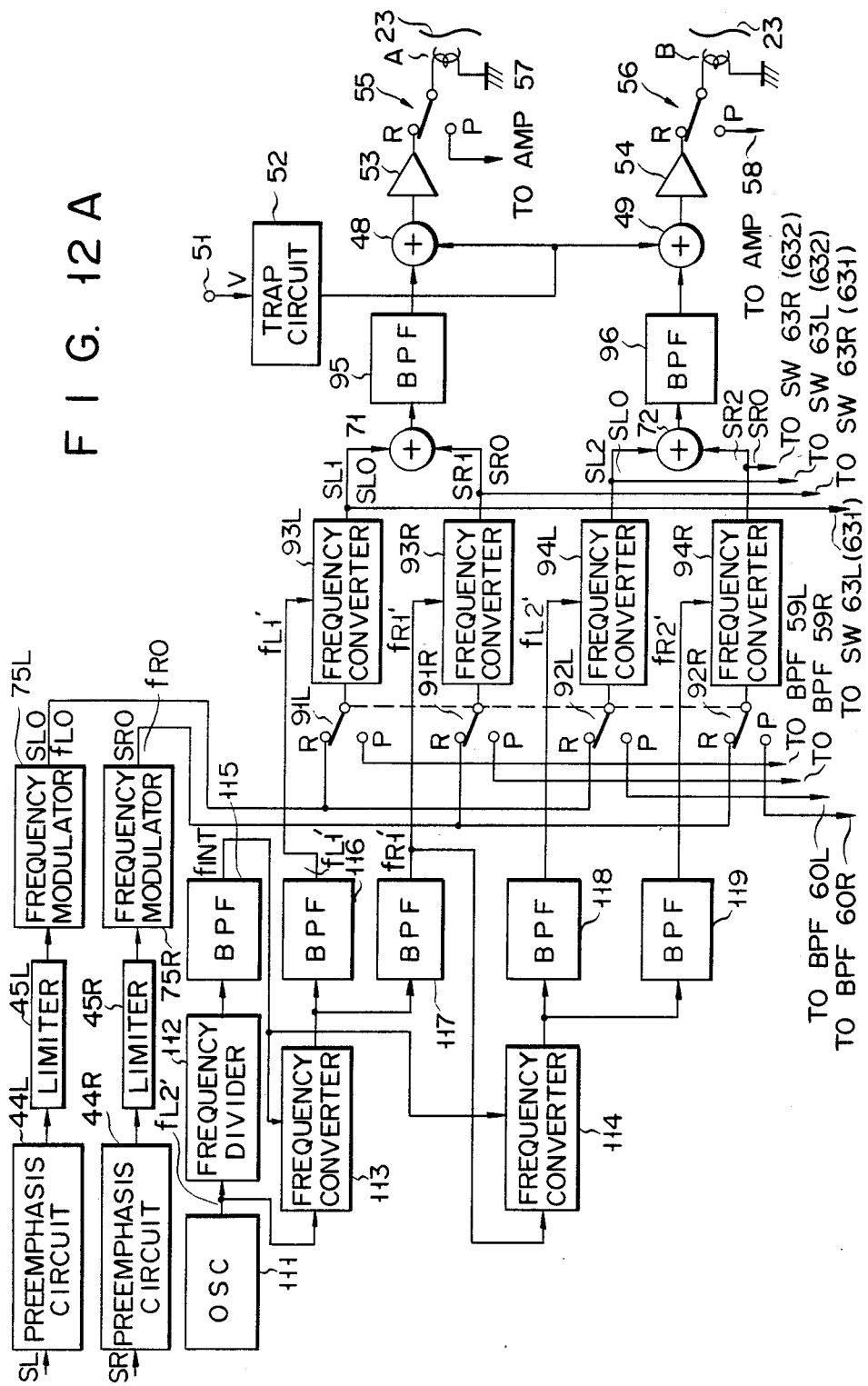
FIGS. 12A and 12B are block diagrams of a VTR according to a sixth embodiment of the present invention.
Figure 12B:
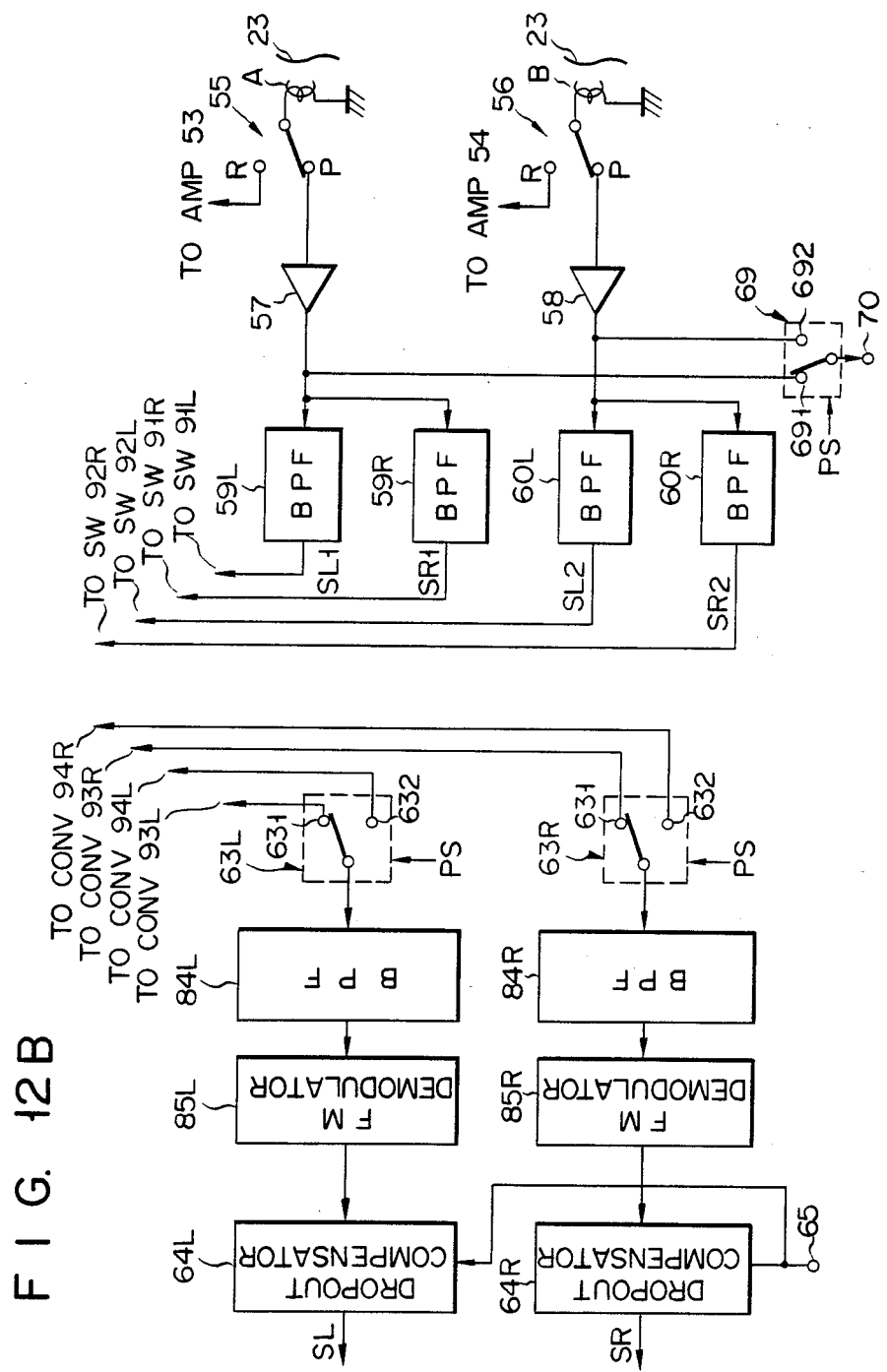

FIGS. 12A and 12B are block diagrams of a VTR according to a sixth embodiment of the present invention. In this embodiment, carrier signals for frequency conversion are obtained using the oscillation signal from a single oscillator when a stereo signal is used as the audio signal.

FIG. 12A shows mainly circuit arrangement operated in the recording mode, and FIG. 12B shows mainly circuit arrangement operated in the playback mode. The same reference numerals as used in FIGS. 10A, 10B and 11 denote the same parts in FIGS. 12A and 12B.

Referring to FIGS. 12A and 12B, four carrier signals which are respectively used by frequency converters 93L, 93R, 94L and 94R are produced by a circuit which comprises an oscillator 111, a frequency divider 112, frequency converters 113 and 114, and band-pass filters 115 to 119. The four carrier signals have different frequencies fL1', fR1', fL2' and fR2' (fL1'<fL2'<fR1'<fR2'). Frequencies fINT corresponding to differences between any two adjacent carrier signals in the sequence above are equal to each other. In other words, the following relation is established: fINT=fL2'−fL1'=fR1'−fL2'=fR2'−fR1'. The oscillation frequency of the oscillator 111 is preset to be the frequency fL2'. The oscillation frequency is preset to be an N multiple (where N is a natural number) of the frequency fINT corresponding to a difference between carrier frequencies.

The oscillation signal from the oscillator 111 is frequency-divided by the frequency divider 112 into signal having the frequency fINT. The band-pass filter 115 extracts the signal of the frequency fINT from the frequency-divided output and supplies it to the frequency converter 113. The frequency converter 113 produces signals which respectively have frequencies (fL2'−fINT) and (fL2'+fINT), that is, the frequencies fL1' and fR1', using the signals which respectively have frequencies fL2' and fINT. The signals which have the frequencies fL1' and fR1' are respectively extracted by the band-pass filters 116 and 117. These signals (frequencies fL1' and fR1') are supplied as carrier signals to the frequency converters 93L and 93R. The frequency converter 114 produces signals which respectively have frequencies (fR1'−fINT) and (fR1'+fINT), that is, the frequencies fL2' and fR2', using the signals of frequencies fINT and fR1' from the band-pass filters 115 and 117 respectively. The signals (frequencies fL2' and fR2') are extracted by the band-pass filters 118 and 119 and are supplied as carrier signals for frequency conversion to the frequency converters 94L and 94R, respectively.

Now we consider an influence of a frequency departure ΔfL2' in the oscillation signal from the oscillator 111 because of a time lag between the recording and playback modes. The frequencies of the four carrier signals are changed in accordance with the frequency departure ΔfL2' as follows:

$$fL1'' = fL2' + \Delta fL2' - (fL2' + \Delta fL2')/N \qquad (13)$$

-continued $$fL1'' = fL1' + \Delta fL2' - fL2'/N \quad (14)$$

$$fL2'' = fL2' + \Delta fL2' + (fL2' + \Delta fL2')/N - (fL2' + \Delta fL2')/N$$
$$= fL2' + \Delta fL2'$$

$$fR1'' = fL2' + \Delta fL2' + (fL2' + \Delta fL2')/N \quad (15)$$
$$= fR1' + \Delta fL1' + \Delta fL1'/N$$

$$fR2'' = fL2' + \Delta fL2' + (fL2' + \Delta fL2')/N + (fL2' + \Delta fL2')/N \quad (16)$$
$$= fR2' + \Delta fL2' + (2/N)\Delta fL2'$$

Changes in frequencies of the carrier signals for frequency conversion cause changes in carrier frequencies of audio signals SL0, SR0, SL0 and SR0 respectively produced from the frequency converters 93L, 93R, 94L and 94R in the playback mode as follows:

$$fL1'' - fL1 = fL1' - fL1 + \Delta fL2' - \Delta fL2'/N \quad (17)$$
$$= fL0 + \Delta fL2' - \Delta fL2'/N$$
$$fL2'' - fL2 = fL2' - fL2 + \Delta fL2' \quad (18)$$
$$= fL0 + \Delta fL2'$$
$$fR1'' - fR1 = fR1' - fR1 + \Delta fL2' + \Delta fL2'/N \quad (19)$$
$$= fR0 + \Delta fL2' + \Delta fL2'/N$$
$$fR2'' - fR2 = fR2' - fR2 + \Delta fL2' + (2/N)\Delta fL2' \quad (20)$$
$$= fR0 + \Delta fL2' + (2/N)\Delta fL2'$$

As may be apparent from equations (17) to (20), a frequency difference between the A and B tracks is $\Delta fL2'/N$ in both the L and R channels. Therefore, a deviation in the DC levels of the demodulated outputs between the A and B tracks in any channel is very small.

In the above embodiment, since the oscillation frequency is preset to be fL2', only two frequency converters are required to produce four carrier signals for frequency conversion. This is also the case when the oscillation frequency is preset to be fR1'. However, when the oscillation frequency is preset to be fL1' or fR2', three frequency converters are required.

It is noted that the encoder 43 in the recording mode and the decoder 67 in the playback mode, as shown in FIG. 2, are used for noise reduction and dynamic range expansion by compressing the signal in the recording mode and expanding it in the playback mode, but they are not essential to the present invention.

Furthermore, in the above embodiment, the audio signal to be recorded is supplied to the video head with the video signal. The composite signal is then recorded on the magnetic tape. However, the audio signal alone may be supplied to the video head and may be recorded on the magnetic tape.

The second embodiment shown in FIGS. 6(A) and 6(B), the fourth embodiment shown in FIGS. 10(A) and 10(B) and the sixth embodiment shown in FIGS. 12(A) and 12(B) may process an audio signal consisting of two audio signal components, instead of the stereo signal. Such an audio signal may be a bilingual broadcasting signal which consists, for example, a Japanese audio signal and an English audio signal.

What is claimed is:

1. A video tape recorder comprising:
first and second video heads adapted to helically scan a magnetic tape to record a sigal thereon or to reproduce a signal therefrom;
frequency modulating means for frequency-modulating an audio source signal in a recording mode to produce a first audio recording signal;
first frequency-converting means for frequency-converting the first audio recording signal in the recording mode to produce a second audio recording signal adapted to be recorded on said magnetic tape, and for frequency-converting a second audio playback signal reproduced from said magnetic tape in a playback mode to produce a first audio playback signal;
second frequency converting means for frequency-converting the first audio recording signal in the recording mode to produce a third audio recording signal to be recorded on said magnetic tape and for frequency-converting a third audio playback signal reproduced from said magnetic tape in the playback mode to produce a first audio playback signal;
FM demodulating means for FM-demodulating the first audio playback signals from said first and second frequency-converting means to reproduce an audio source signal;
switching means for supplying the second and third audio recording signals from said first and second video heads, in the recording mode, and for supplying the second and third audio playback signals reproduced by said first and second video heads to said first and second frequency converting means, respectively, in the playback mode; and
carrier generating means for generating first and second carrier signals for frequency conversion which are supplied to said first and second frequency converting means, respectively, the frequency of said first carrier signal being different from the frequency of said second carrier signal.

2. A video tape recorder according to claim 1, wherein said second and third audio recording signals are mixed with a video signal and are recorded together with said video signal on the magnetic tape.

3. A video tape recorder according to claim 2, wherein the video signal includes a luminance signal and a chrominance signal which have different frequency bands, and frequency bands of second and third recording and playback audio signals lie in a gap between the frequency bands of the luminance and chrominance signals.

4. A video tape recorder according to claim 1, wherein said carrier generating means comprises:
said first carrier generating means for generating first carrier signals to be used in said first frequency converting means; and
second carrier generating means for generating said second carrier signals to be used in said second frequency converting means.

5. A video tape recorder according to claim 1, wherein said first frequency converting means comprises a frequency converter and switch means for supplying the first audio recording signal from said frequency modulating means to the frequency converter in the recording mode and for supplying the second audio playback signal produced from said magnetic tape to the frequency converter in said playback mode, and
said second frequency converting means comprises a frequency converter and switch means for supplying the first audio signal from said frequency modulating means to the frequency converter in the recording mode and for supplying the third audio signal produced from said magnetic tape to the frequency converter in the playback mode.

6. A video tape recorder according to claim 1, wherein said FM demodulating means comprises:
a switch having a movable contact, a first stationary contact for receiving the first audio playback signal from said first frequency converting means in the playback mode and a second stationary contact for receiving the first audio playback signal from said second frequency converting means in the playback mode, said movable contact being selectively connected to said first and second stationary contacts substantially in synchronism with said helical scanning of said first and second video heads, thereby mixing audio signals from said first and second frequency converting means; and an FM demodulator for FM demodulating the selected audio signal from said switch.

7. A video tape recorder according to claim 1, wherein carrier generating means comprises:

oscillating means for producing an oscillation signal which has a predetermined frequency; and carrier producing means for producing from the oscillation signal a first carrier signal for frequency conversion to be achieved by said first frequency converting means and a second carrier signal for frequency conversion to be achieved by said second frequency converting means.

8. A video tape recorder according to claim 7, wherein the oscillation signal has the same frequency as that of the first carrier signal; and said carrier producing means supplies the oscillation signal as the first carrier signal for frequency conversion to said first frequency converting means, frequency-divides the oscillation signal to produce a frequency-divided signal having a frequency equal to a difference between the frequencies of the first and second carrier signals, and frequency-converts the oscillation signal by the frequency-divided signal, thereby producing the second carrier signal.

9. A video tape recorder according to claim 8, wherein the oscillation signal has the frequency which is a natural number multiple of a difference between the frequencies of the first and second carrier signals.

10. A video tape recorder according to claim 1, wherein the audio signal to be frequency-modulated by said frequency modulating means is a stereophonic signal containing an L channel signal and an R channel signal, said frequency modulating means comprises a first frequency modulating section for frequency-modulating the L channel signal and a second frequency modulating section for frequency-modulating the R channel signal, said first frequency converting means comprises a first frequency converting section for frequency converting the L channel signal and a second frequency converting section for frequency-converting the R channel signal, said second frequency converting means comprises a first frequency converting section for frequency-converting the L channel signal and a second frequency coverting section for frequency-converting the R channel signal, said FM demodulating means comprises a first FM demodulating section for FM demodulating the L channel signal and a second FM demodulating section for FM demodulating the R channel signal, and said carrier generating means comprises means for generating first and second carrier signals of L channel and first and second carrier signals of the R channel, said first and second carrier signals of the L channel and said first and second carrier signals of R channel respectively having frequencies which are different from one another.

11. A video tape recorder according to claim 10, wherein the first frequency converting section of said first frequency converting means comprises a frequency converter and a switch for supplying the first audio signal of L channel to the frequency converter in the recording mode and for supplying the second audio signal of L channel reproduced from said magnetic tape to the frequency converter in the playback mode, the second frequency converting section of said first frequency converting means comprises a frequency converter and a switch for supplying the first audio signal of R channel to the frequency converter in the recording mode and for supplying the second audio signal of R channel reproduced from said magnetic tape to the frequency converter in the playback mode, the first frequency converting section of said second frequency converting means comprises a frequency converter and a switch for supplying the first audio signal of L channel to the frequency converter in the recording mode and for supplying the third audio signal of L channel reproduced from said magnetic tape to the frequency converter in the playback mode, and the second frequency converting section of said second converting means comprises a frequency converter and a switch for supplying the first audio signal of R channel to the frequency converter in the recording mode and for supplying the third audio signal of R channel reproduced from said magnetic tape to the frequency converter in the playback mode.

12. A video tape recorder according to claim 10, wherein said carrier generating means comprises a first carrier generating section for generating the first and second carrier signals of L channel and a second carrier generating section for generating the first and second carrier signals of R channel.

13. A video tape recorder according to claim 10, wherein said carrier generating means comprises oscillation means for generating an oscillation signal of a predetermined frequency and carrier producing means for producing the first and second carrier signals of said L channel and the first and second carrier signals of said R channel from said oscillation signal.

14. A video tape recorder according to claim 13, wherein any two adjacent ones of said carrier signals of said first and second carrier signals for said L channel and said first and second carrier signals for said R channel have the same frequency difference in the L and R channels, and said oscillation signal has a same frequency as one of said carrier signals, and wherein said carrier producing means produces a frequency-divided signal which has the same frequency as the frequency difference between the any two adjacent ones of said carrier and produces said carrier signals by frequency-converting said oscillation signal by said frequency-divided signal.

15. A video tape recorder according to claim 14, wherein said oscillation signal has a frequency which is a natural number multiple of said frequency difference.

16. A video tape recorder according to claim 14, wherein frequencies fa, fb, fc and fd of said carrier signals have a relation fa<fb<fc<fd, and said frequency of said oscillation signal is set to be one of fb and fc.

17. A video tape recorder according to claim 16, wherein the oscillation signal is frequency-converted by a frequency-divided signal corresponding to the oscillation signal which has one of the frequencies fb and fc, thereby producing carrier signals for frequency conversion which have one of a set of the frequencies fa and fc and a set of the frequencies fb and fd, and the carrier signal for frequency conversion which has one of the frequencies fc and fb is frequency-converted by the frequency-divided signal to produce the carrier signals for frequency conversion which have the other one of the set of the frequencies fb and fd and the set of the frequencies fa and fc.

18. A method of recording high quality audio signals on a video tape, comprising the steps of:

frequency modulating said audio signal to produce a single frequency modulated signal;

first frequency converting said frequency modulated signal;

independently of and simultaneously with said first frequency converting, second frequency converting said frequency modulated signal, said second frequency converting occurring at a different carrier frequency than said first frequency converting;

selectively recording signals produced by said first and second frequency steps on said video tape.

19. A method for recording high quality audio signals on a video tape and playing them back from the tape, comprising the steps of:

frequency modulating said audio signal to produce a single frequency modulated signal;

first frequency converting said frequency modulated signal;

independently of and simultaneously with said first frequency converting, second frequency converting said frequency modulated signal, said second frequency converting occurring at a different carrier frequency than said first frequency converting;

selectively recording signals produced by said first and second frequency converting steps on said video tape;

sensing a signal on said video tape and producing signals indicative thereof;

filtering said produced signal;

first frequency re-converting said produced signal using a same carrier frequency as said first frequency converting;

independently of and simultaneously with said first frequency re-converting, second frequency re-converting said produced signals using a same carrier frequency as in said second frequency converting; and selectively demodulating said frequency reconverted signals to thus obtain a playback audio signal therefrom.

* * * * *